Nov. 25, 1969    TOMOTSUGU TSUYAMA ET AL    3,480,357
SLIDE-FILM CONFIRMING APPARATUS OF A SLIDE PROJECTOR
Filed Dec. 14, 1966    2 Sheets-Sheet 1
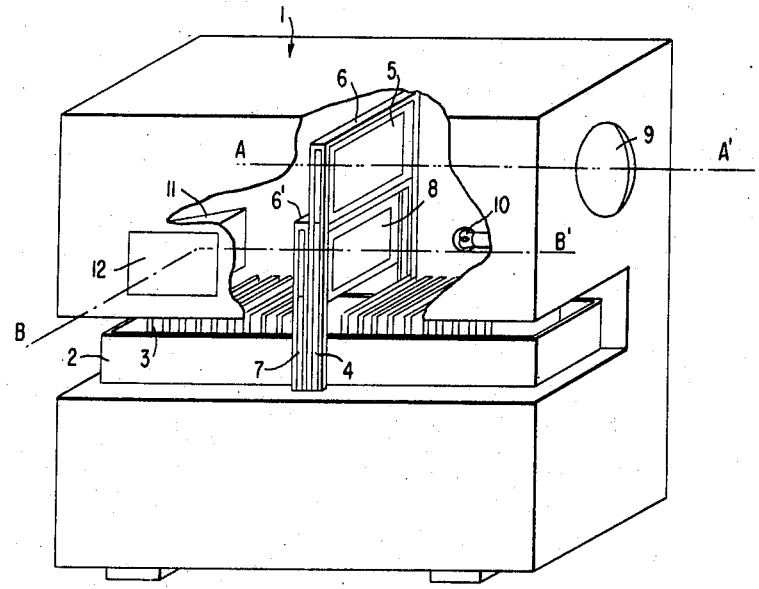
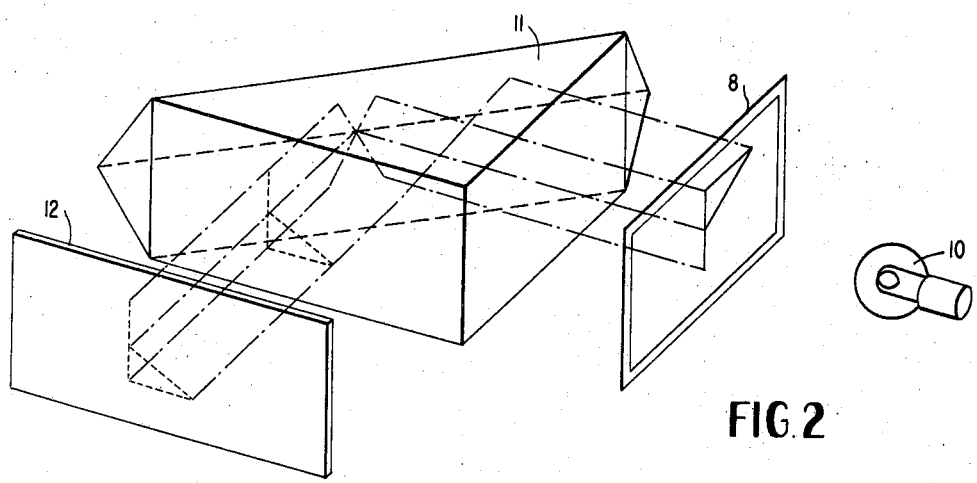
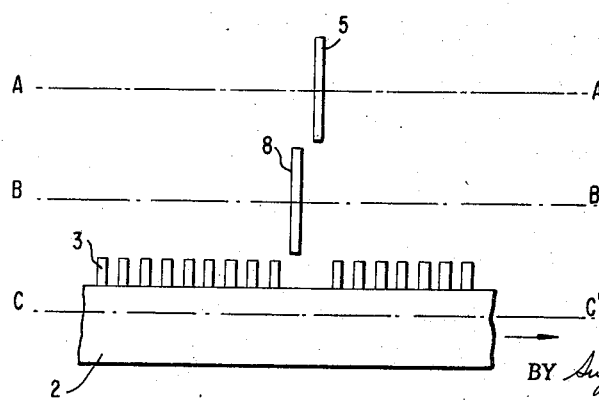
INVENTORS
TOMOTSUGU TSUYAMA
YO TANAKA
BY Sughrue, Rothwell, Mion, Zinn & Macpeak
ATTORNEYS

United States Patent Office 3,480,357
Patented Nov. 25, 1969

3,480,357
SLIDE-FILM CONFIRMING APPARATUS OF A SLIDE PROJECTOR
Tomotsugu Tsuyama and Yo Tanaka, Tokyo, Japan, assignors to Fuji Shashin Film Kabushiki Kaisha, Ashigara-Kamigun, Kanagawa, Japan
Filed Dec. 14, 1966, Ser. No. 601,746
Claims priority, application Japan, Dec. 14, 1965, 40/101,237
Int. Cl. G03b 21/26
U.S. Cl. 353—21       3 Claims

ABSTRACT OF THE DISCLOSURE

A slide film positioning apparatus used in a slide projector to simultaneously position successive slides into a first normally projecting position and a second confirming position. First and second slides are moved into a first and second predetermined position, respectively, so as to ensure the second slide being properly oriented before actually being projected on a viewing screen. The slides are positioned by means of a linearly movable push-up frame controlled by a rotating disc, associated cam and a reciprocating lever arm which engages the cam as it travels in a circular path.

---

This invention relates to a slide-film confirming apparatus for a slide-projector.

Heretofore it has been generally the practice that, in the case of the projection of slide-films onto a screen by a slide-projector, the slide-films housed in a housing box are confirmed before projection. The slide-films may also be given direction by punched portions previously formed at the end of the frame. Accordingly, this has necessitated a troublesome confirmation operation. If slide-films are projected without confirmation, they may be projected upside down, in mistaken order or inside out. This leads to confusion of the operator and to forced smiles of the audience, thus spoiling the atmosphere of the projection.

This invention relates to an apparatus by which, during projection of slide-films contained in a housing box onto a screen by a slide-projector, a following slide-film to be next projected is taken out of the housing box for confirmation of the picture thereon through the window in the side of the slide-projector. Thus any slide-film housed in mistaken condition may be corrected at once.

The objects, advantages and novel details of this construction will be more apparent as this description proceeds, especially when considered in connection with the accompanying drawings, wherein:

FIGURE 1 is a perspective view of a slide-projector provided with an apparatus according to this invention, with a part thereof broken away;

FIGURE 2 is a perspective view of an optical system of the apparatus;

FIGURE 3 is a side view showing a condition of slide-films at the time of projection of the apparatus;

Figure 4A:
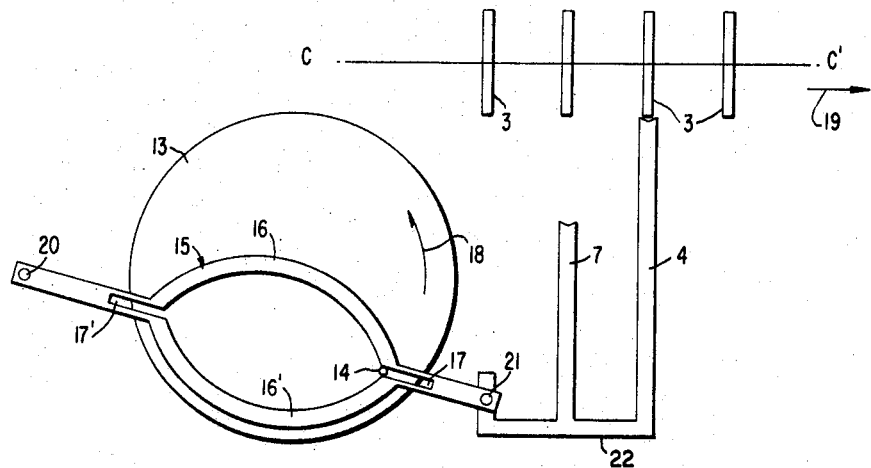

FIGURES 4A and B are views for illustrating the operating mechanism of the apparatus.

By referring to FIGURES 1, 2 and 3, a slide-projector provided with the confirmation apparatus of this invention will be described. Referring now to FIGURES 1, 2 and 3, there are shown a slide-projector body 1, a slide-film housing box 2, slide-films 3 in the housing box 2, a push-up riser 4 for pushing up a more advanced slide-film 3 to the projection position 5 along the guide 6, a push-up piece or riser 7 for pushing up a following slide-film to be next projected to the confirming position 8 along the guide 6', a main optical axis A-A' of the optical system, which is the same as that of a usual slide-projector, a lens 9 for projection, an axis B-B' of a sub-optical system for confirming the following slide-film to be next projected, a light source 10 for confirming, a thatch prism (Dachprisma) 11, and a confirming window 12. FIGURES 4A and B are illustrative views of a mechanism for pushing up a slide-film to determined positions 5 and 8. In FIGURES 4A and B there is shown a disc 13 which is rotated around its axis with a reduced speed from a motor, a pin 14 mounted on the face of said disc 13, a lever 15 which may contact said pin 14 when the disc 13 rotates and which has arc portions 16, 16' each having a radius equal to the distance between the center of the disc 13 and the pin 14, and has slots 17, 17', and which is adapted to rotate around the center of the fixed shaft 20 in the slide-projector body 1. Mounted at the forward end of said lever 15 is frame 22 comprising riser 4 and a push-up piece 7, which move up and down along guides 6, 6', respectively by rotary movement of the lever 15 through a pin 21.

Figure 4B:
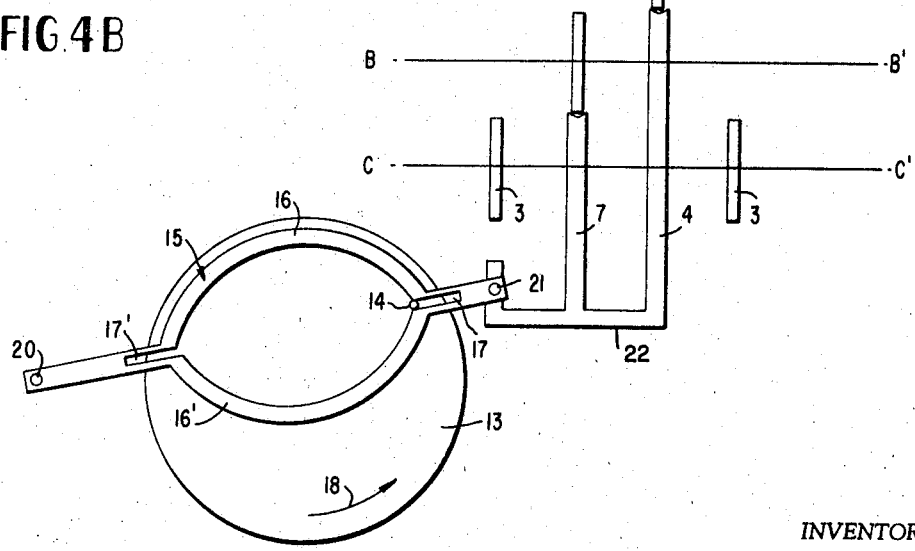

In operation, the slide-film housing box 2 having slide-films therein (at this time the center line of the pictures corresponds to C-C' line) is put in position in the slide-projector body 1. The starting switch of the driving motor is then switched on and the motor starts. Thus, the housing-box 2 is fed in the direction of the arrow 19, shown in FIGURE 4, to the amount for a single slide-film, in the same manner as an automatic slide-film feeding apparatus heretofore used. At the same time disc 13 is rotated around its center axis in the arrow direction 18 shown in FIGURE 4. In the state of FIGURE 4A, all the slide-film 3 are housed in the housing box 2 and stopped therein. When the disc 13 is rotated, then the pin 14 makes the reciprocating movement, and thus the lever 15 is raised and causes, in turn, the riser 4 and the push-up piece 7 to move up along the guide 6, 6'. Thereby the first slide-film 3 may be raised from the axis line C-C' to the confirming position 8 by the upper end of the push-up piece 7. While the disc 13 continues rotation and the pin 14 is contacted to the circular arc portion 16, the slide-film 3 remains stopped, and may be confirmed by peeping through window 12 while light is applied by the confirming light source 10 in the sub-optical system of B-B' axis. The slide-film will be returned back to its place in the housing box 2 by lowering the pin 14 during reciprocation of the pin 14 along the slot 17'. Even if disc 13 continues rotation, lever 15 remains in the state shown in FIGURE 4A while the pin 14 contacts arc portion 16', and during this time the housing box 2 is fed in the arrow direction 19 to the amount of a single slide-film. The slide-film previously confirmed is then raised up by the upper end of the riser 4 by the following rotation of the disc 13, and it may be stopped and projected on a screen, only while the pin 14 contacts arc portion 16, by the main optical system of A-A' axis. At the same time the following slide-film to be next projected is raised up to the sub-optical system of B-B' axis by the push-up piece 7. Transmission light from the light source 10 is confirmed by peeping at it through window 12 by means of the thatch prism 11 which is reversed right and left and turned upside down. The slide-films 3 in housing box 2 are, after such confirmation, projected onto a screen. If an image observed through the window 12 is abnormal, the slide-film may be drawn out of the guide 6' laterally and replaced into normal position while it is in the confirming position. If the power source switch of the driving motor is switched off while the pin 14 is in contact with the arc portion 16, riser 4 and push-up piece 7 are stopped in their raised positions, whereby the projection and confirmations positions of the slide-films can be maintained. At this time, if the power source is switched on, the exchange of slide-film will begin again.

By using a slide-projector with a confirming apparatus according to the invention, confirmation of the setting order, direction of the face and the top and bottom of the slide-film can be performed before projection thereof onto a screen. This will avoid confusion of the operator, forced smiles of the audience and spoiling of the atmosphere of the projection. There is no necessity for providing any moving portion in either optical system. Therefore a slide-projector provided with the present confirming apparatus for the projection of slide-film will scarcely get out of order and can be obtained at a low price.

What is claimed is:

1. In a slide projector in which a stack of at least two film slides is intermittently advanced so that the individual slides in the stack are brought to the desired position for projection, one at a time, the improvement comprising a slide position confirming apparatus comprising a push-up frame, riser means on said frame for simultaneously moving film slides out of the line of the stack, said riser means moving a first advanced slide a first pre-determined distance and a second slide a second pre-determined distance from said stack, wherein said riser means comprises a plurality of riser arms extending from said push-up frame and having means engaging an edge of said first advanced and said second slides, and positioning means connected to said push-up frame for moving said frame into engagement with said slide so that said first advanced and said second slides are moved to a first and second predetermined positions from said stack, respectively, a main optical projection means for projecting said slides onto a screen, an axis of said main optical means passing through said first advanced slide when it has been moved to said first predetermined distance from said stack, a second sub-optical projection means, an axis of said second sub-optical means passing through said second slide when it has been moved to said second predetermined distance from said stack, means for viewing said second slide when moved to said second pre-determined distance above said stack, whereby when said first advanced slide is projected, the position of said second slide may be simultaneously observed by said viewing means.

2. In a slide projector in which a stack of at least two film slides is intermittently advanced so that the individual slides in the stack are brought to the desired position for projection, one at a time, the improvement comprising a slide position confirming apparatus comprising, a push-up frame, riser means on said frame for simultaneously moving film slides out of the line of the stack, said riser means moving a first advanced slide a first pre-determined distance and a second slide a second pre-determined distance from said stack, a positioning means engaging said push-up frame, said positioning means including a lever arm connected at one end to said push-up frame, a rotatably mounted disc, a cam means mounted on said disc and engaging said lever arm, whereby rotation of said disc causes said first advanced and said second slides to be moved into and out of a first and second pre-determined position, respectively, due to the cooperating linear movement of said push-up frame, a main optical projection means for projecting said slides onto a screen, an axis of said main optical means passing through said first advanced slide when it has been moved to said first pre-determined distance from said stack, a second sub-optical projection means, an axis of said second sub-optical means passing through said second slide when it has been moved to said second pre-determined distance from said stack, means for viewing said second slide when moved to said second pre-determined distance above said stack, whereby when said first advanced slide is projected, the position of said second slide may be simultaneously observed by said viewing means.

3. The slide projector and slide confirmation apparatus of claim 2 wherein said cam is moved along a generally circular path during rotation of said disc, said lever arm comprising two oppositely disposed arcuate portions, two longitudinal slots on said arm between said arcuate portions, said cam mounted on said disc so as to successively engage said arcuate and slotted portions of said lever arm, whereby said first advanced and said second slides are moved to said first and second predetermined positions, respectively, during one portion of said circular path and during a second portion by which said frame is returned to its starting position for reception of the successive slides in the stack.

References Cited

UNITED STATES PATENTS 2,711,118    6/1955    Briskin et al. _____ 88—28 XR
2,979,987    4/1961    Brumley et al. _____ 40—79 XR

FOREIGN PATENTS 722,934    12/1965    Canada.

NORTON ANSHER, Primary Examiner

RICHARD M. SHEER, Assistant Examiner

U.S. Cl. X.R.

40—79; 353—115, 116